No. 718,620. PATENTED JAN. 20, 1903.
J. C. GRIFFIN.
COTTON SEED DROPPER AND FERTILIZER DISTRIBUTER.
APPLICATION FILED OCT. 25, 1902.
NO MODEL.
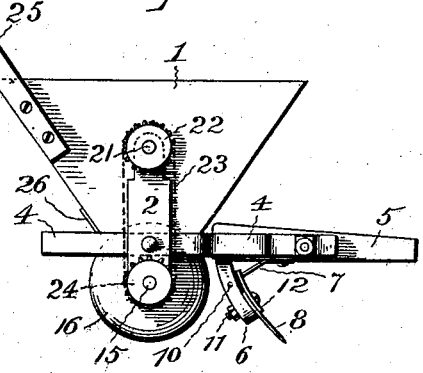
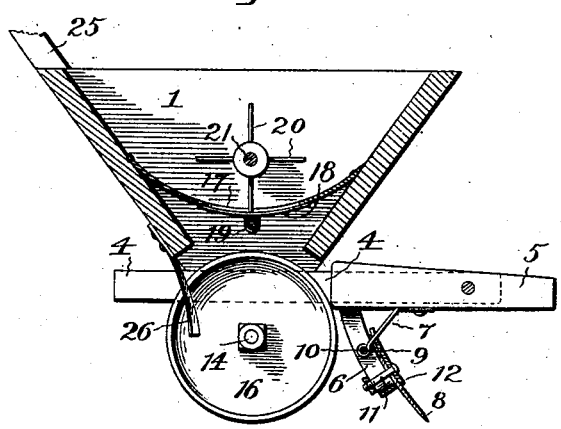 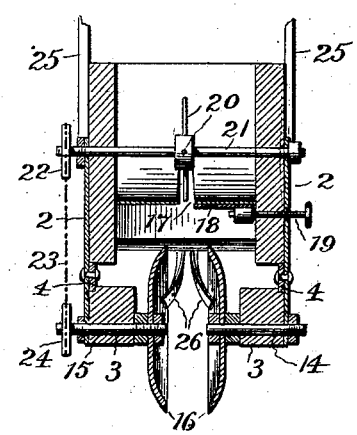
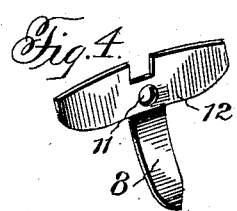
Witnesses:
Jas. E. Hutchinson
H. A. Farnham
Inventor.
John C. Griffin
By Swift and Co., Atty's.
THE NORRIS PETERS CO., PHOTO-LITHO., WASHINGTON, D. C.

UNITED STATES PATENT OFFICE.

JOHN C. GRIFFIN, OF NINETYSIX, SOUTH CAROLINA.

COTTON-SEED DROPPER AND FERTILIZER-DISTRIBUTER.

SPECIFICATION forming part of Letters Patent No. 718,620, dated January 20, 1903.

Application filed October 25, 1902. Serial No. 128,739. (No model.)

*To all whom it may concern:*

Be it known that I, JOHN C. GRIFFIN, a citizen of the United States, residing at Ninetysix, in the county of Greenwood and State of South Carolina, have invented a new and useful Cotton-Seed Dropper and Fertilizer-Distributer; and I do hereby declare the following to be a full, clear, and exact description of the invention, such as will enable others skilled in the art to which it appertains to make and use the same.

The invention relates to a cotton-seed dropper and fertilizer-distributer; and it has for its object to provide a simple and comparatively inexpensive planter and fertilizer-distributer of this character adapted to open a furrow, smooth the soil, drop the seed and fertilizer directly into the furrow, and cover the seed after the same has been deposited.

The invention consists in the novel construction and arrangement of parts hereinafter described and shown, and particularly pointed out in the claims hereto appended.

In the drawings forming part of this specification, and in which like numerals of reference designate corresponding parts, Figure 1 is a side elevation of a cotton-seed dropper and fertilizer-distributer constructed in accordance with this invention. Fig. 2 is a longitudinal sectional view of the same. Fig. 3 is a transverse sectional view. Fig. 4 is a detail perspective view illustrating the arrangement of the shovel on the transverse blade.

Referring to the drawings, 1 designates a hopper provided at opposite sides with depending bearing-arms 2, having inwardly extending bearing-blocks 3, spaced from the lower edges of the sides of the hopper to receive side bars or beams 4, having converging front portions which are secured to the side faces of a beam 5. The beam 5 extends rearward beyond the front ends of the side bars or beams 4 and has a standard 6 depending from it. The standard 6, which is composed of two sides, is supported by a brace 7 and has secured to it a shovel 8 for opening a furrow for the seed and fertilizer. The brace, which is secured at its top to the lower edge of the beam 5, has its lower ends arranged between the sides of the standard and is provided with an eye 9 to receive a transverse bolt 10, which secures the brace to the standard.

The shovel is secured to the standard by a bolt which passes through the space between the sides of the standard, and this bolt 11 also secures a transverse blade 12 to the standard. The transverse blade which smooths the earth is provided at its upper edge with a recess 13, forming shoulders for engaging the brace, whereby it is prevented from turning on the bolt 11.

The depending bearing-arms and the bearing-blocks are provided with openings for the reception of stub-shafts 14 and 15, which carry concavo-convex covering-disks 16, which present exterior convex faces. The space between the disks which support the planter and distributer is entirely open to permit the seed and fertilizer to fall directly into the furrow, and the said disks are adapted to cover the cotton-seed, which is discharged through a longitudinal slot or opening 17 of the bottom of the hopper.

The bottom of the hopper is curved, and the slot or opening is varied in size by a cut-off 18, which is connected with an adjusting-screw 19, extending through one side of the hopper and engaging a threaded opening of the adjacent bearing-arm. The screw is provided with an exterior head, by means of which it may be readily adjusted. The seed and fertilizer are agitated in the hopper by means of a stirrer-wheel consisting of a series of stirrer-arms 20, extending radially from a central hub which is secured to a transverse shaft 21. The shaft 21 extends through the sides of the hopper, and it has keyed or otherwise secured to it a sprocket-wheel 22, which is connected by a sprocket-chain 23 with a similar wheel 24, mounted on a stub-shaft 15. When the disk of the stub-shaft rotates, motion will be communicated to the stirrer-arms, and the seed and fertilizer will be positively fed through the slot or opening of the bottom of the hopper.

A pair of handles 25 is secured to the hopper, at the back thereof, and these handles, which are of the ordinary construction, are arranged at opposite sides of the hopper.

The disks are cleaned by means of a scraper 26, secured to the back of the hopper and provided with diverging blades arranged at the inner faces of the disks.

It will be seen that the cotton-seed dropper and fertilizer-distributer is exceedingly simple and inexpensive in construction, that it is adapted to open a furrow, smooth the soil, and drop seed and fertilizer in the furrow, and that it is capable of covering the same. It will also be apparent that the disks which support the planter and fertilizer-distributer also communicate motion to the feed or stirrer wheel.

The cotton-seed and fertilizer may be mixed and dropped simultaneously, or the seed may be dropped without fertilizer.

What I claim is—

1. The combination of a hopper having a longitudinal opening at its bottom, stub-shafts terminating short of the center of the hopper and located beneath the same, and covering-disks mounted on the inner ends of the stub-shafts, the entire space between the disks being open, substantially as described.

2. The combination of a hopper having a longitudinal opening at its bottom, arms depending from the hopper, bearing-blocks extending inward from the arms and spaced from the sides of the hopper, side beams secured to the arms and fitted between the bearing-blocks and the lower edges of the sides of the hopper, stub-shafts journaled in openings of the arms and the blocks and spaced apart at their inner end, covering-disks mounted on the inner ends of the shafts and a stirrer-wheel arranged within the hopper and operated by one of the disks, substantially as described.

3. The combination of a hopper, arms depending from the hopper, disks mounted on the arms and having the entire space between them open, and scrapers secured to the back of the hopper and provided with blades arranged at the inner faces of the disks, substantially as described.

In testimony whereof I have hereto affixed my signature in the presence of two witnesses.

JOHN C. GRIFFIN.

Witnesses:
J. W. LESESNE,
JNO. B. SLOAN.